United States Patent
Yates et al.

(10) Patent No.: US 8,016,124 B2
(45) Date of Patent: Sep. 13, 2011

(54) THIN FILM GAS SEPARATION MEMBRANES

(75) Inventors: Stephen Yates, Arlington Heights, IL (US); Rehan Zaki, Naperville, IL (US); Amber Arzadon, Chicago, IL (US); Chunqing Liu, Schaumburg, IL (US); Jeffrey Chiou, Irvine, CA (US)

(73) Assignee: Honeywell International Inc., Morristown, NJ (US)

( * ) Notice: Subject to any disclaimer, the term of this patent is extended or adjusted under 35 U.S.C. 154(b) by 219 days.

(21) Appl. No.: 12/428,309

(22) Filed: Apr. 22, 2009

(65) Prior Publication Data

US 2010/0269698 A1 Oct. 28, 2010

(51) Int. Cl.
*B01D 71/64* (2006.01)
*B01D 71/68* (2006.01)
*B01D 71/00* (2006.01)
*B01D 59/12* (2006.01)

(52) U.S. Cl. ............ 210/500.39; 210/500.41; 96/4; 96/14; 110/203

(58) Field of Classification Search .......... None
See application file for complete search history.

(56) References Cited

U.S. PATENT DOCUMENTS

| | | | |
|---|---|---|---|
| 5,393,323 A | | 2/1995 | Simmons |
| 5,608,014 A * | | 3/1997 | Ekiner ................ 525/432 |
| 5,917,137 A * | | 6/1999 | Ekiner .................. 96/10 |
| 7,195,711 B2 | | 3/2007 | Gorsuch et al. |
| 7,344,585 B1 | | 3/2008 | Kulprathipanja et al. |
| 7,393,914 B2 | | 7/2008 | Moore et al. |
| 2004/0222148 A1* | | 11/2004 | Yuan ................ 210/500.39 |
| 2007/0187320 A1 | | 8/2007 | Mabuchi et al. |
| 2008/0044643 A1 | | 2/2008 | Yokota et al. |
| 2008/0197072 A1 | | 8/2008 | Ansorge et al. |
| 2010/0095876 A1* | | 4/2010 | Looney et al. ........... 110/203 |
| 2010/0242723 A1* | | 9/2010 | Liu et al. ................. 95/46 |

* cited by examiner

*Primary Examiner* — Krishnan S Menon
(74) *Attorney, Agent, or Firm* — Robert Desmond, Esq.

(57) ABSTRACT

A gas separation membrane comprises a blend of polyethersulfone (PES) and aromatic polyimide polymers that may comprise a plurality of first repeating units of formula (I),

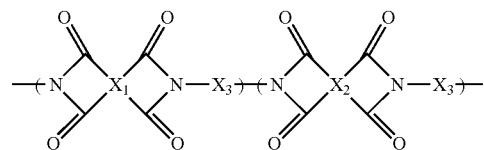

wherein $X_1$, $X_2$ and $X_3$ are herein defined.

19 Claims, 5 Drawing Sheets

THIN FILM GAS SEPARATION MEMBRANES

BACKGROUND OF THE INVENTION

The present invention generally relates to gas separation membranes and, more particularly, to gas separation membranes that may be formed as thin films on supporting base structures of polyethersulfone (PES).

Gas separation membranes (GSM) may be employed to separate a particular gas from a mixture of gases. For example, a GSM may be used to separate and remove oxygen from air so that a resultant gas mixture will not be combustible. GSM's may also be employed to separate carbon dioxide ($CO_2$) from methane ($CH_4$) and hydrogen ($H_2$) from $CH_4$.

Many GSM's are formed from polymers with molecular structures that are dense enough to significantly reduce the permeation of larger molecules such as $CH_4$ but are sufficiently porous to allow smaller molecules such as $H_2$ to diffuse through the GSM. The degree to which the GSM provides selective blocking of some gases and passages of others is referred to as "selectivity" of the GSM.

Useful membranes for separating gases must have sufficient selectivity to distinguish between two gases, and must also have high flux. Flux is generally quantified as either permeance or permeability. Permeance, measured in Gas Permeation Units (GPU), is the gas flow (measured as cubic centimeter, $cm^3$, at standard temperature and pressure (STP)), per membrane area ($cm^2$), per trans-membrane pressure drop (cm Hg), per unit time (second or s): 1 $GPU=10^{-6} cm^3$ (STP)/$cm^2$ S (cm Hg). Permeability, measured in Barrer, is the permeance multiplied by the skin layer thickness of the membrane 1 $Barrer=10^{-10} cm^3$ (STP) $cm/cm^2$ S (cm Hg). Flow through the membrane will increase with increasing membrane area or trans-membrane pressure drop, and will decrease with increased membrane selective layer thickness.

In this context, it is desirable that a GSM have low selective layer thickness. Indeed the lower the thickness of the selective layer, the higher the flux. But, thin GSM's tend to be fragile. Consequently, in many practical applications, a GSM may be supported on a base support structure. Such a support structure may be substantially porous with respect to the gas mixtures that are the subject of separation. In other words, a material for a support structure may be selected to provide strength while not reducing flux.

As can be seen, there is a need to provide a GSM that may provide high separation selectivity for a gas mixture and a high flux. There is also a need to provide such a GSM in a structure that has sufficient strength for use in practical applications.

SUMMARY OF THE INVENTION

In one aspect of the present invention, a gas separation membrane comprises a blend of polyethersulfone (PES) and aromatic polyimide polymers that comprise a plurality of first repeating units of formula (I)

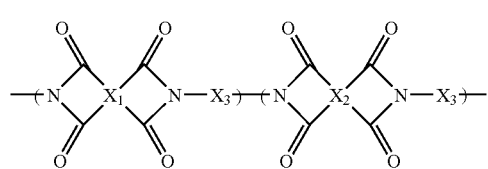

wherein $X_1$ is selected from the group consisting of

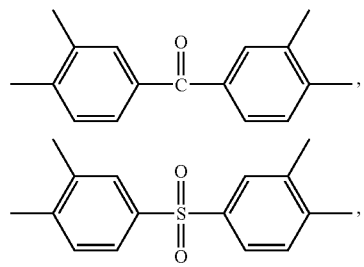

and mixtures thereof;

$X_2$ is selected from the group consisting of

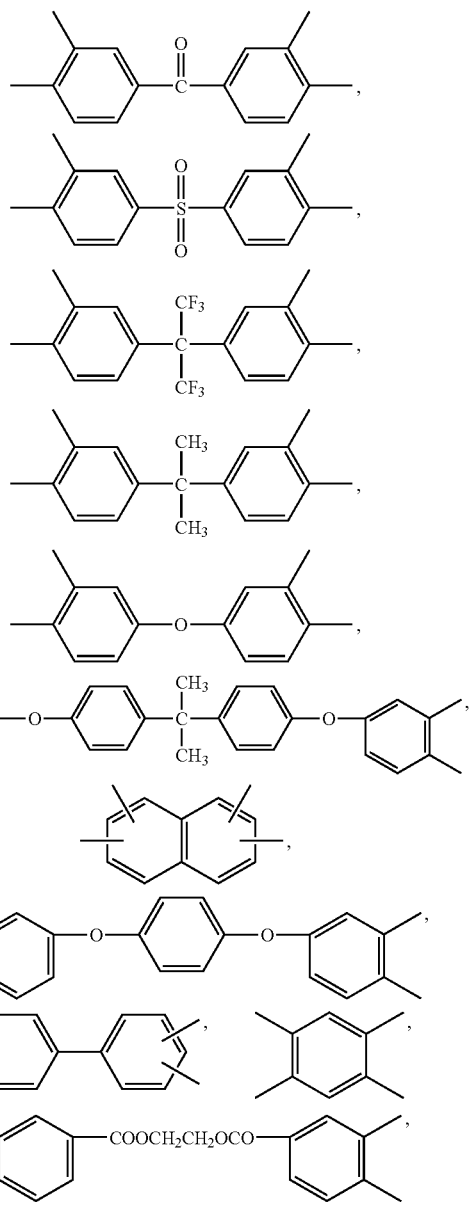

-continued

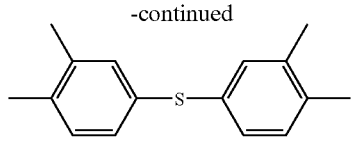

and mixtures thereof; and $X_3$ is selected from the group consisting of

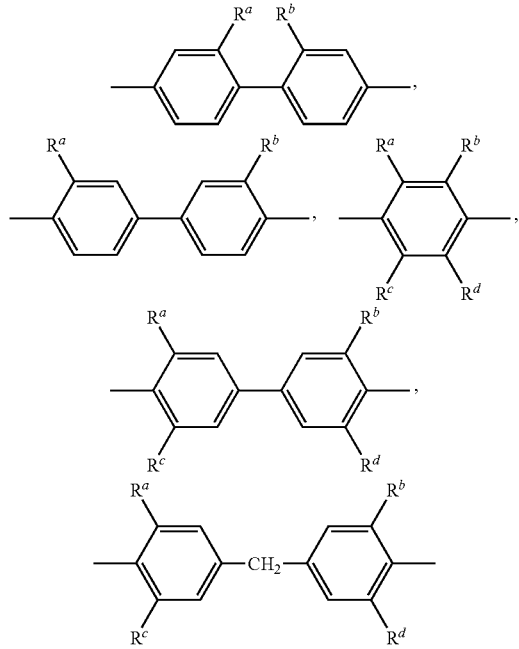

and mixtures thereof, wherein the phenyl groups of $X_1$, $X_2$ and $X_3$ are optionally substituted with one or more substituents independently selected from the group consisting of $C_1$-$C_3$ alkyl, $C_1$-$C_3$ alkoxy, halogen, nitro and —$NR^1R^2$, wherein $R^a$, $R^b$, $R^c$ and $R^d$ are each independently $C_1$-$C_3$ alkyl, and $R^1$ and $R^2$ are H or $C_1$-$C_3$ alkyl, provided that both $R^1$ and $R^2$ are not H.

In another aspect of the present invention, a gas separation unit comprises a thin-film gas separation membrane and a support structure for the membrane wherein the gas separation membrane comprises a blend of polyethersulfone and aromatic polyimide polymers that comprise a plurality of first repeating units of formula (I)

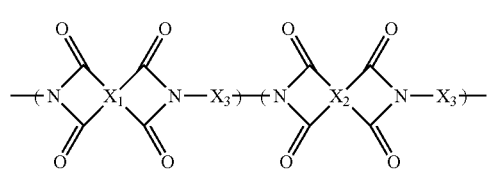 (I)

wherein $X_1$ is selected from the group consisting of

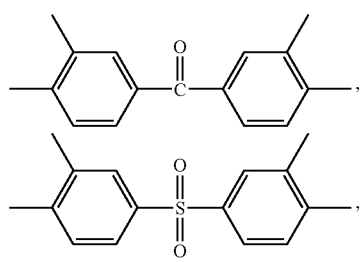

and mixtures thereof;

$X_2$ is selected from the group consisting of

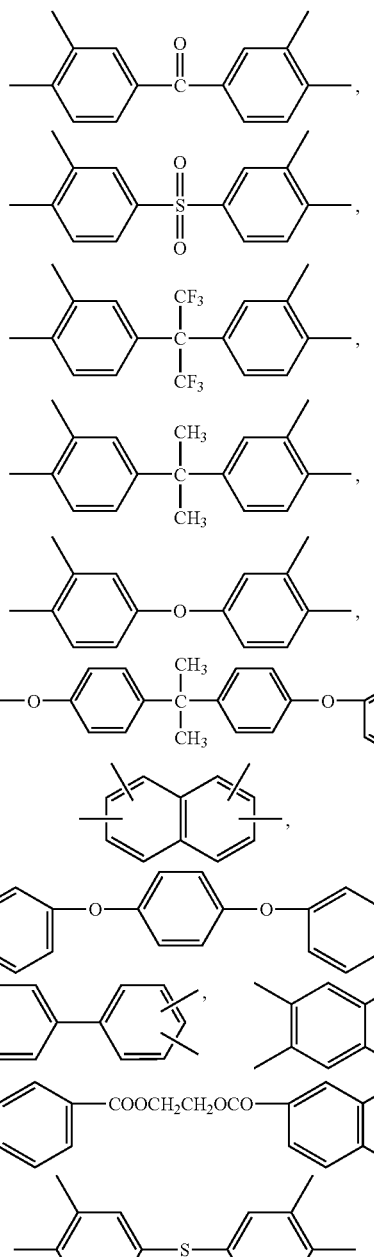

and mixtures thereof; and $X_3$ is selected from the group consisting of

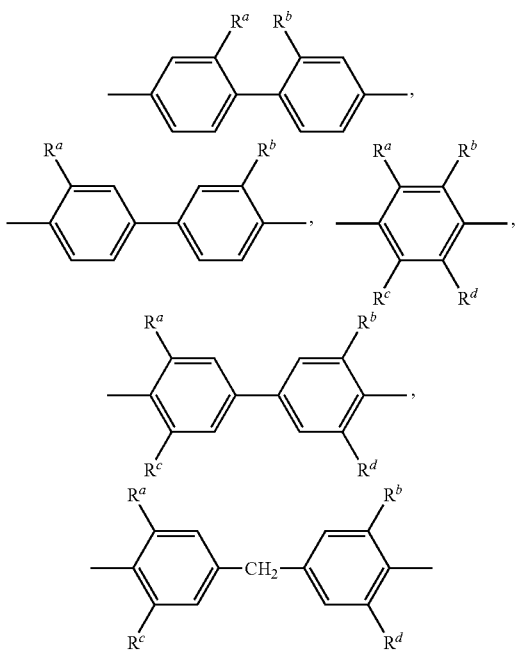

and mixtures thereof, wherein the phenyl groups of $X_1$, $X_2$ and $X_3$ are optionally substituted with one or more substituents independently selected from the group consisting of $C_1$-$C_3$ alkyl, $C_1$-$C_3$ alkoxy, halogen, nitro and —$NR^1R^2$, wherein $R^a$, $R^b$, $R^c$ and $R^d$ are each independently $C_1$-$C_3$ alkyl, and $R^1$ and $R^2$ are H or $C_1$-$C_3$ alkyl, provided that both $R^1$ and $R^2$ are not H.

In still another aspect of the present invention a method for producing a gas separation hollow fiber membrane comprises the steps of: co-extruding a fluid stream that comprises a bore solution, a core solution and a sheath solution; passing the fluid stream through an air gap; passing the fluid stream into a water bath to produce transformation of the fluid stream into a nascent fiber; and choosing a mixture of solvents and non-solvents so that the sheath solution is nearly saturated therein, thereby requiring causing precipitation or coagulation of the sheath solution upon evaporation of the solvent or diffusion into the water bath.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention may be useful in selectively separating one or more gases from a mixture of gases. More particularly, embodiments of the present invention may provide for gas separation with a thin-film GSM supported on a strengthening structure. Embodiments of the present invention may be particularly useful in vehicles such as aircraft which may employ air separation modules to provide nitrogen-enriched air (NEA) to prevent accidental combustion in fuel tanks.

Figure 1A:
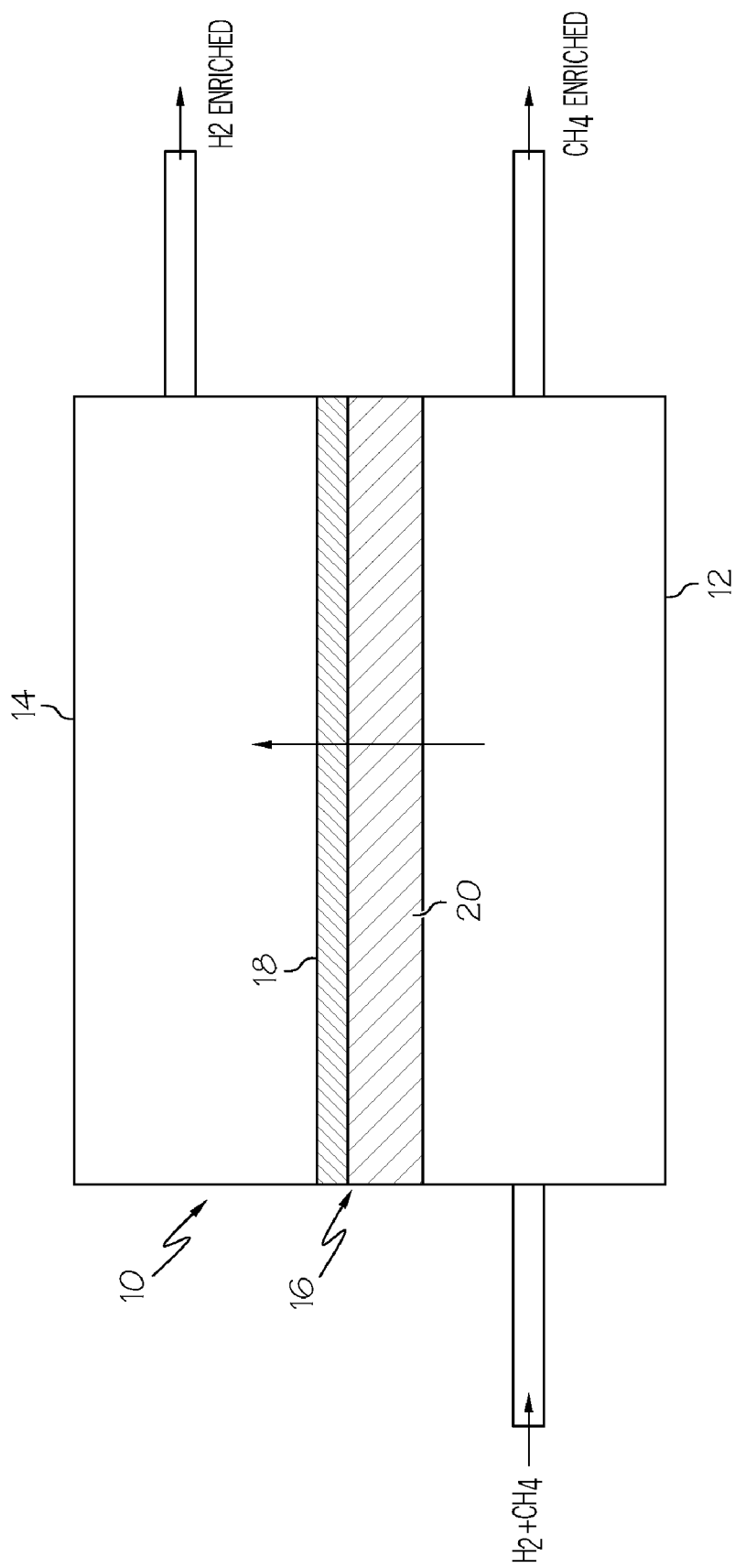
FIG. 1A is block diagram of a gas separator for separating hydrogen from methane in accordance with an embodiment of the present invention.

Referring now to FIG. 1A, an exemplary embodiment of the invention is illustrated in the context of separation of hydrogen gas ($H_2$, or simply, hydrogen) from methane ($CH_4$). A separator 10 may comprise an input chamber 12 and an output chamber 14. Methane may be passed through the input chamber 12 under pressure. As the methane passes through the input chamber 12, some hydrogen may diffuse through a gas separation unit designated generally by the numeral 16. The gas separation unit 16 may comprise a gas separation membrane (GSM) 18 and a support structure 20. The GSM 18 may be a thin film having an asymmetric structure and a thickness of between about 0.1 microns and 3 microns, as an example. In the illustrative embodiment of FIG. 1A, the GSM 18 is on an output side of the gas separation unit 16. One of the gas separation units 16 may also be employed in a configuration in which the GSM 18 is on an input side of the gas separation unit 16.

Figure 1B:
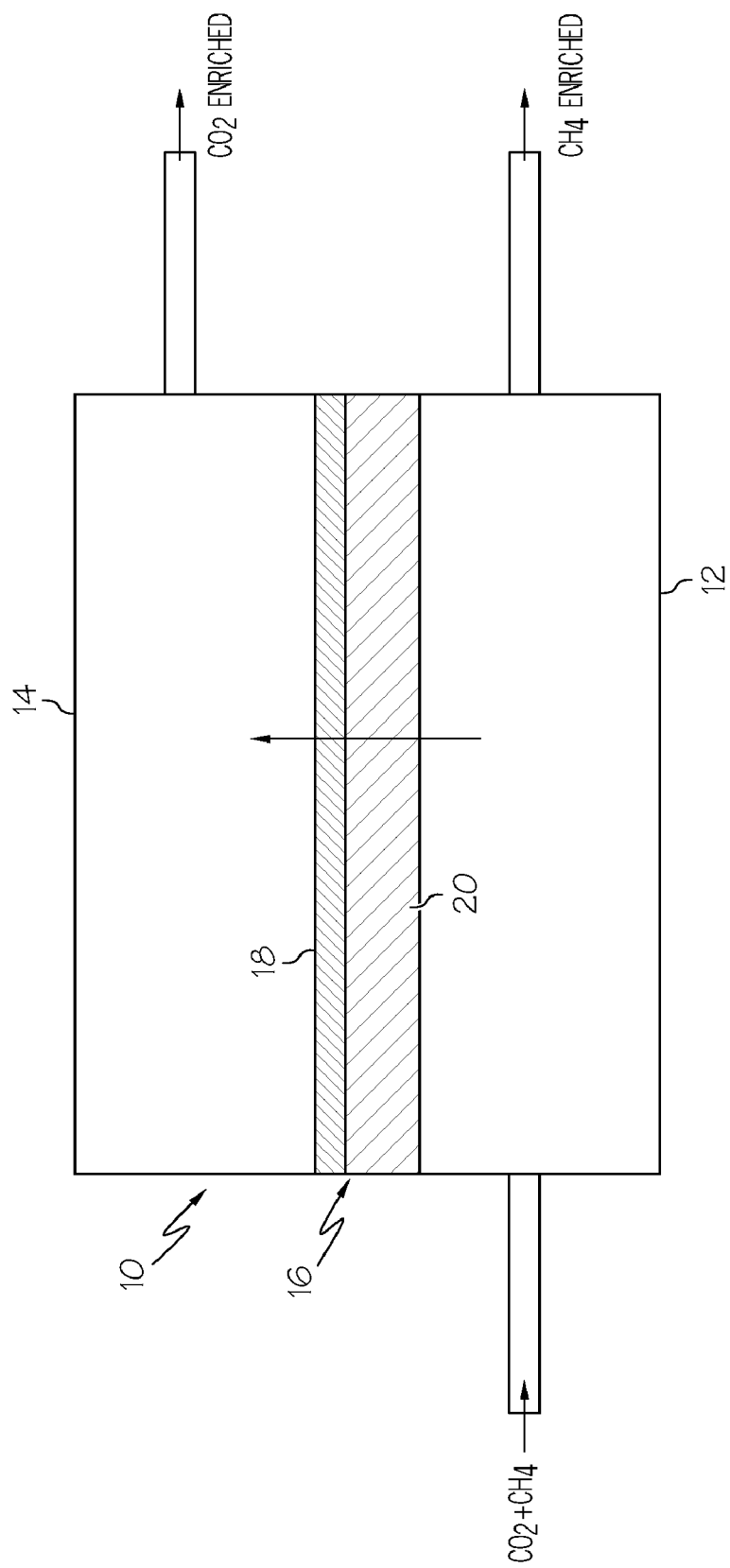
FIG. 1B is a block diagram of a gas separator for separating carbon dioxide from methane in accordance with an embodiment of the present invention.

Similarly, as illustrated in FIG. 1B, carbon dioxide ($CO_2$) may be separated from methane.

Figure 2:
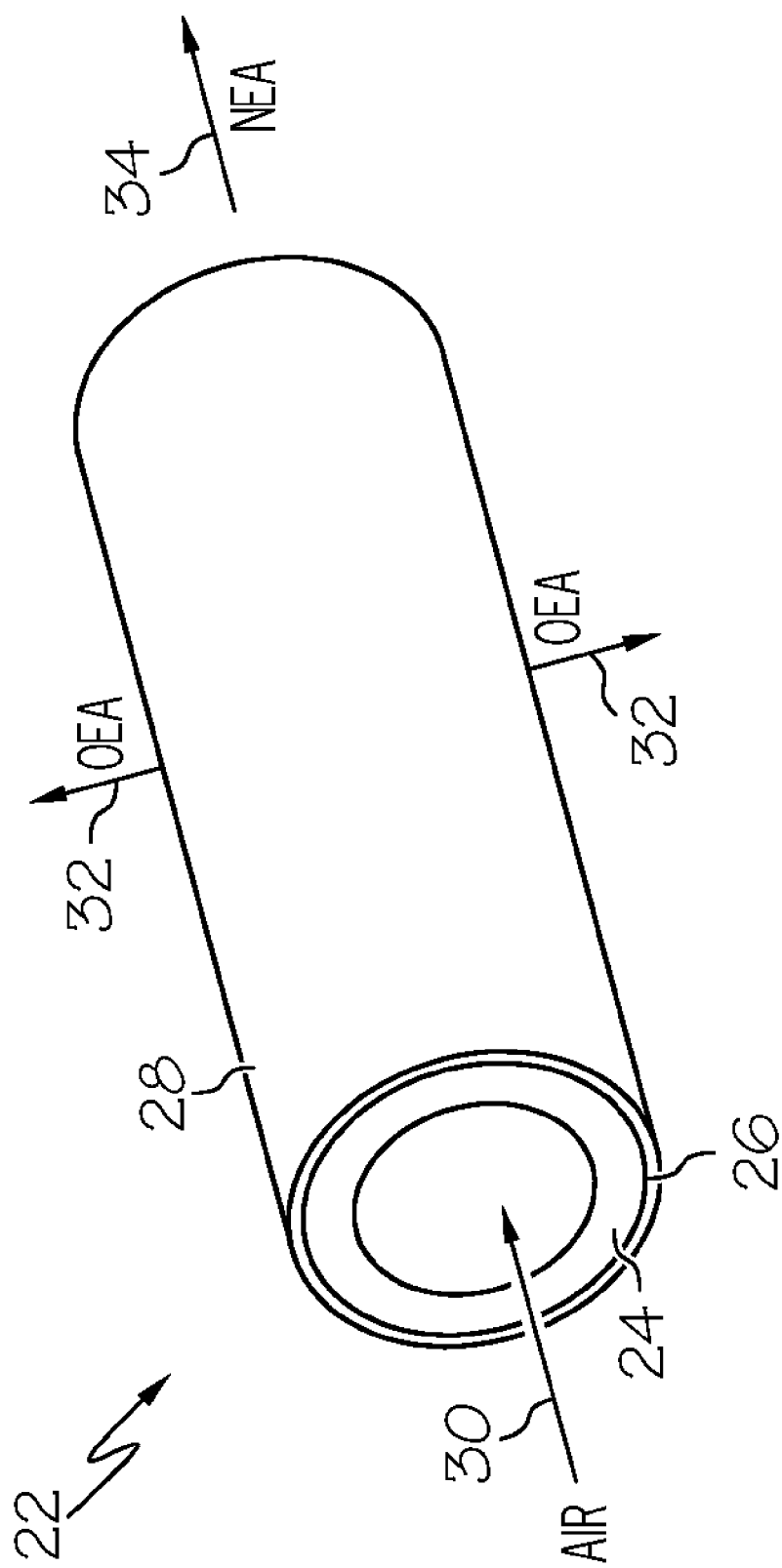
FIG. 2 is a perspective view of a portion of a gas separation fiber in accordance with an embodiment of the present invention.

Referring now to FIG. 2, an exemplary embodiment of the invention is illustrated in the context of separation of oxygen gas ($O_2$, or simply oxygen) from air. This type of gas separation may be referred to as $O_2/N_2$ separation. A gas separation unit may be formed as a gas separation hollow fiber membrane 22 that may comprise a hollow bore or air passage 24, a cylindrical supporting core 26 (as further described in the below Examples) and a cylindrical GSM 28 concentrically formed around the core 26. The GSM 28 may be a thin film with an asymmetric structure and a thickness of between about 0.1 microns and 3 microns, as an example.

Air, represented by arrows designated with numeral 30, may pass through the air passage 24 under pressure. Some selected gas may diffuse through the gas separation fiber more rapidly than other air components 22 during passage of the air 30 through the air passage 24. The resulting gas mixture may comprise oxygen and other air components wherein the oxygen concentration is significantly higher than in the air stream (oxygen enriched air (OEA)) which may represented by outflowing arrows designated by the numerals 32. As the air 30 passes through the air passage 24, its oxygen concentration may be reduced over time. When gas emerges from the air passage 24, it may be in a form that may be considered nitrogen enriched air (NEA). The NEA may be represented by an arrow designated by the numeral 34.

The NEA 34 may be useful in fuel tanks of an aircraft. During flight of an aircraft, as fuel is consumed, its fuel tanks contain an increasing ullage volume in which air and fuel vapor may be present. There is a risk of accidental combustion of the air and fuel vapor if the oxygen concentration of the air is allowed to be greater than about 12% by volume. The gas separation hollow fiber membrane 22 of the present embodiment of the invention may be useful for $N_2/O_2$ separation in an aircraft to provide NEA to the fuel tanks and thereby preclude presence of oxygen concentration greater than 12% by volume in the fuel-tank air. In this context, a plurality of the gas separation hollow fibers 22 may be incorporated into an air separation module (ASM). Such an ASM is disclosed in US Patent Application 2008/0060523 which is incorporated by reference herein.

It has been found that some blends of polymers may be particularly useful for employment as GSM's in embodiments of the present invention. In particular it has been found that blends of PES and some polyimides may be useful in embodiments of the present invention. The utility of these blends of polymers may be enhanced when they are employed as thin-film GSM's that are supported on support structures formed from polyethersulfone (PES).

Blends which may be useful for the GSM's 18 and 28 may comprise blends of PES and aromatic polyimide polymers that may comprise a plurality of first repeating units of formula (I)

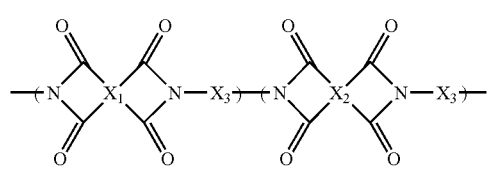

(I)

wherein
$X_1$ is selected from the group consisting of

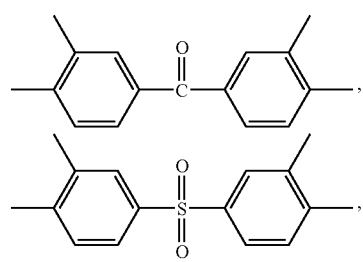

and mixtures thereof;
$X_2$ is selected from the group consisting of

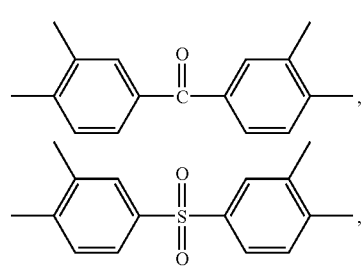

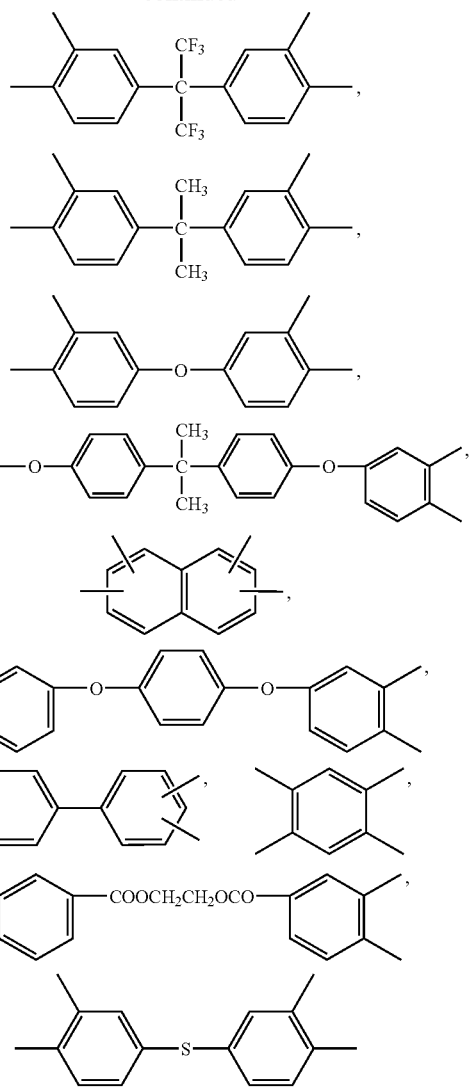

and mixtures thereof; and
$X_3$ is selected from the group consisting of

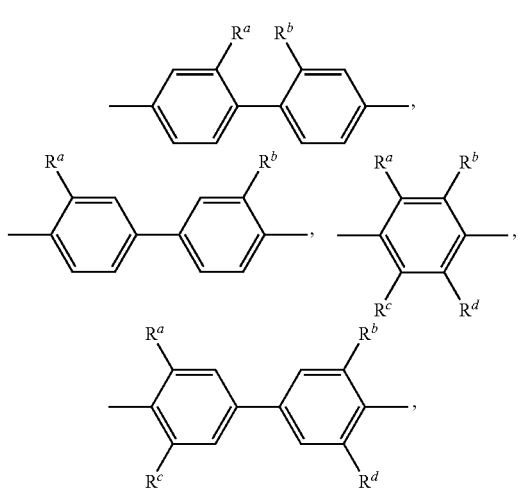

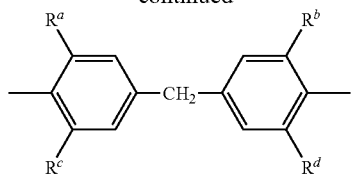

and mixtures thereof, wherein the phenyl groups of $X_1$, $X_2$ and $X_3$ are optionally substituted with one or more substituents independently selected from the group consisting of $C_1$-$C_3$ alkyl, $C_1$-$C_3$ alkoxy, halogen, nitro and —$NR^1R^2$, wherein $R^a$, $R^b$, $R^c$ and $R^d$ are each independently $C_1$-$C_3$ alkyl, and $R^1$ and $R^2$ are H or $C_1$-$C_3$ alkyl, provided that both $R^1$ and $R^2$ are not H.

Some examples of aromatic polyimide polymers useful for embodiments of the present invention may include, but are not limited to: poly(3,3',4,4'-diphenylsulfone tetracarboxylic dianhydride-3,3',5,5'-tetramethyl-4,4'-methylene dianiline) derived from the condensation reaction of 3,3',4,4'-diphenylsulfone tetracarboxylic dianhydride (DSDA) and 3,3',5,5'-tetramethyl-4,4'-methylene dianiline (TMMDA), referred to as poly(DSDA-TMMDA) or PDT; poly(3,3',4,4'-diphenylsulfone tetracarboxylic dianhydride-pyromellitic dianhydride-3,3',5,5'-tetramethyl-4,4'-methylene dianiline) derived from the condensation reaction of 3,3',4,4'-diphenylsulfone tetracarboxylic dianhydride (DSDA, 50 mole %) and pyromellitic dianhydride (PMDA, 50 mole %) with 3,3',5,5'-tetramethyl-4,4'-methylene dianiline (TMMDA, 100 mole %), referred to as poly(DSDA-PMDA-TMMDA) or PDPT; poly(3,3',4,4'-benzophenone tetracarboxylic dianhydride-pyromellitic dianhydride-4,4'-oxydiphthalic anhydride-3,3',5,5'-tetramethyl-4,4'-methylene dianiline) derived from the condensation reaction of 3,3',4,4'-diphenylsulfone tetracarboxylic dianhydride (BTDA, 25 mole %), pyromellitic dianhydride (PMDA, 50 mole %) and 4,4'-oxydiphthalic anhydride (ODPA, 25 mole %) with 3,3',5,5'-tetramethyl-4,4'-methylene dianiline (TMMDA, 100 mole %), referred to as poly(BTDA-PMDA-ODPA-TMMDA) (PBPOT) or poly(3,3',4,4'-benzophenone tetracarboxylic dianhydride-pyromellitic dianhydride-3,3',5,5'-tetramethyl-4,4'-methylene dianiline) derived from the condensation reaction of 3,3',4,4'-diphenylsulfone tetracarboxylic dianhydride (BTDA, 50 mole %) and pyromellitic dianhydride (PMDA, 50 mole %) with 3,3',5,5'-tetramethyl-4,4'-methylene dianiline (TMMDA, 100 mole %), referred to as (poly(BTDA-PMDA-TMMDA, PBPT); and poly(3,3',4,4'-benzophenone tetracarboxylic dianhydride-3,3',5,5'-tetramethyl-4,4'-methylene dianiline), derived from the condensation reaction of 3,3',4,4'-diphenylsulfone tetracarboxylic dianhydride (BTDA, 100 mole %) with 3,3',5,5'-tetramethyl-4,4'-methylene dianiline (TMMDA, 100 mole %), referred to as poly(BTDA-TMMDA) (PBT).

In an exemplary embodiment of the GSM 18 of FIGS. 1A and 1B a blend of polymers was prepared in accordance with Example 1 set forth below. Resultant performances of the blend of Example 1 are set forth in Examples 2 and 3 below.

EXAMPLE 1

Preparation of Poly(DSDA-TMMDA) (PDT)/Polyethersulfone (PES) Blend Polymer Dense Film 7.2 g of PDT polyimide polymer and 0.8 g of polyethersulfone (PES) were dissolved in a solvent mixture of 14.0 g of N-methyl-2-pyrrolidone (NMP) NMP and 20.6 g of 1,3-dioxolane. The mixture was mechanically stirred for 3 hours to form a homogeneous casting dope. The resulting homogeneous casting dope was allowed to degas overnight. A PDT-PES blend polymer dense film was prepared from the bubble free casting dope on a clean glass plate. The dense film, together with the glass plate, was then put into a vacuum oven. The solvents were removed by slowly increasing the vacuum from 101 kPa to $\leq 2.67 \times 10^{-4}$ kPa within 12 h and the temperature of the vacuum oven. Finally, the dense film was dried at 200° C. under vacuum for at least 48 hours to completely remove the residual solvents to form the PDT-PES blend polymer dense film.

A gas separation hollow fiber membrane produced in the manner described above may have a combination of permeability and selectivity that makes the membrane suitable for use in aircraft on-board inerting gas generating systems (OBIGGS) such as those described in US Patent Application 2008/0060523. In particular, the gas separation hollow fiber membrane 22 may have the following exemplary characteristics as described in the Examples below.

EXAMPLE 2

$CO_2/CH_4$ Separation Properties of PDT-PES Blend Polymer Dense Film

The permeabilities ($P_{CO2}$ and $P_{CH4}$) and selectivity ($\alpha_{CO2/CH4}$) of the PDT-PES blend polymer dense film prepared in Example 1 were measured by pure gas measurements at 50° C. under about 690 kPa (100 psig) pressure using a dense film test unit. The results in Table 1 show that the $\alpha_{CO2/CH4}$ and the $P_{CO2}$ of the PDT-PES blend polymer dense film are 24.8 and 18.5, respectively.

TABLE 1

Pure gas permeation test results of PDT-PES blend polymer dense film for $CO_2/CH_4$ separation[a]

| Dense film | $P_{CO2}$ (Barrer) | $\alpha_{CO2/CH4}$ |
|---|---|---|
| PDT-PES | 18.5 | 24.8 |

[a]Tested at 50° C. under 690 kPa (100 psig) pure gas pressure;
1 Barrer = $10^{-10}$ ($cm^3$(STP) · cm)/($cm^2$ · sec · cmHg)

EXAMPLE 3

$H_2/CH_4$ Separation Properties of PDT-PES Blend Polymer Dense Film

The permeabilities ($P_{H2}$ and $P_{CH4}$) and selectivity ($\alpha_{H2/CH4}$) of the PDT-PES blend polymer dense film prepared in Example 1 were measured by pure gas measurements at 50° C. under about 690 kPa (100 psig) pressure using a dense film test unit. The pure gas permeation testing results in Table 2 showed that the $\alpha_{H2/CH4}$ and the $P_{H2}$ of the PDT-PES blend polymer dense film are 60.1 and 44.8, respectively.

TABLE 2

Pure gas permeation test results of PDT-PES blend polymer dense film for $H_2/CH_4$ separation[a]

| Dense film | $P_{H2}$ (Barrer) | $\alpha_{H2/CH4}$ |
|---|---|---|
| PDT-PES | 44.8 | 60.1 |

[a]Tested at 50° C. under 690 kPa (100 psig) pure gas pressure;
1 Barrer = $10^{-10}$ ($cm^3$(STP) · cm)/($cm^2$ · sec · cmHg)

Referring back to FIG. 2 and the gas separation hollow fiber membrane 22, it may be noted that the core 26 may be formed from PES and the GSM may be formed as a sheath layer 28 on the core 26. The sheath layer 28 may comprise a blend of PES and a polyimide of the type described herein above. It has been found that a polyimide with a sulfone group may be particularly suitable for use in the sheath layer 28. Without being held to a particular theory, it appears that the sheath layer 28 may adhere well to the PES core 26 when the sheath layer includes sulfone groups. By way of non-limiting example, it has been found that a blend that includes the polyimide PDT, described above, may exhibit desirable adhesion between the sheath layer 28 and the core 26.

Figure 3:
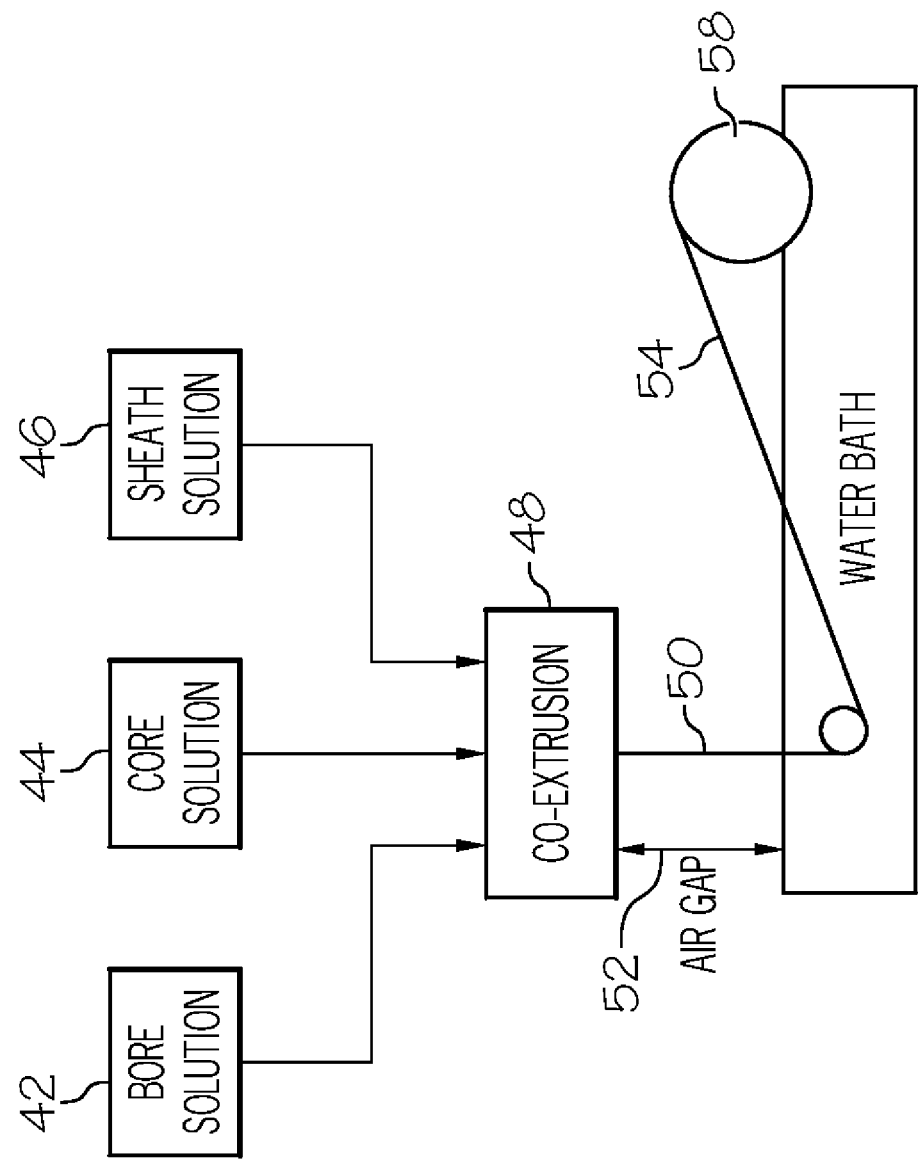
FIG. 3 is a block diagram of a system for producing a gas separation fiber in accordance with an embodiment of the present invention.

Referring now to FIG. 3, a block diagram may illustrate a system for producing the hollow fiber membrane 22 of FIG. 2. In general terms, production of gas separation hollow fiber membrane 22 may be described as a co-extrusion from three liquids followed by and a precipitation of the hollow fiber membrane 22. More specifically, the hollow fiber membrane 22 may result from co-extrusion of a bore solution 42, a core solution 44 and a sheath solution 46 through a co-extrusion spinneret 48. A three component liquid stream 50 may emerge from the spinneret 48 and pass through an air gap 52. The stream 50 may undergo transformation into a nascent fiber 54 as it passes into and through a water bath 56. The nascent fiber 54 may then be collected on a drum-like take-up reel 58. In subsequent conventional cleaning and drying processes (not shown) the nascent fiber 54 may be transformed into the gas separation hollow fiber membrane 22.

It has been found that control of certain parameters may contribute to production of the gas separation hollow fiber membrane 22 with desirable properties. For example, in an exemplary embodiment of the present invention, the sheath solution 46 may comprise the composition shown in Table 3, below.

TABLE 3

| Chemical | Mass (g) |
| --- | --- |
| PDT | 5.03 |
| PES | 0.71 |
| Isopropanol | 2.54 |
| Acetone | 2.54 |
| Octane | 0.5 |
| 1,3-Dioxolane | 10.0 |
| N-methyl-2-pyrrolidone (NMP) | 7.0 |

It may be noted that in Table 3, a ratio of polymer mass to solvent mass is about 20%. Based on average molecular weights for PDT and PES, the sheath solution 46 may have a viscosity of about 10,000 centipoise when formulated in accordance with Table 3. PDT may have varying molecular weights depending on the degree of polymerization that occur during its production. Variations in molecular weight may result in variations of viscosity of the sheath solution 46. In order to achieve viscosity at about 10,000 centipoise, the ratio the polymers PDT and PES to the solvents may be varied. Typically, the polymer to solvent ratio is maintained above about 15%.

In an exemplary embodiment of the invention the core solution 44 may comprise about 35 weight percent PES and 65 weight percent NMP. The air passage or bore solution 42 may comprise 90% NMP and 10% water.

The air gap 50 may be about 10 centimeter (cm), as an example. As the fluid stream 50 passes through the air gap 52, some evaporation of solvents may occur. The sheath solution may be comprised of one or more solvents and non-solvents.

The mixture of solvents and non-solvents may be chosen so that the polymer is on the edge of solubility. Thus, it may take very little loss of solvent via either evaporation or diffusion into the water bath to begin precipitation or coagulation. In the above example NMP and 1,3-dioxolane, are solvents, and isopropanol, acetone and octane are non-solvents. In the above mixture, 1,3-dioxolane is volatile while NMP is much less volatile, and acetone is volatile while isopropanol and octane (relatively speaking) are less volatile. Thus, a mixture of solvents may be tailored to get the correct amount of evaporation in the air gap.

TABLE 4

Pure gas permeation test results of PDT-PES blend polymer dense film for $O_2/N_2$ separation[a]

| Fiber | $P_{O2}$ (Barrer) | $\alpha_{O2/N2}$ |
| --- | --- | --- |
| PDT-PES | 9.66 | 3.61 |

[a]Tested at 50° C. under 690 kPa (100 psig) pure gas pressure;
1 Barrer = $10^{-10}$ $(cm^3(STP) \cdot cm)/(cm^2 \cdot sec \cdot cmHg)$ In other words, the gas separation hollow fiber membrane 22 may be provided with selectivity $\alpha_{O2/N2}$ that is higher than 3 while its permeability may be as high as 9 Barrer, as an example.

Figure 4:
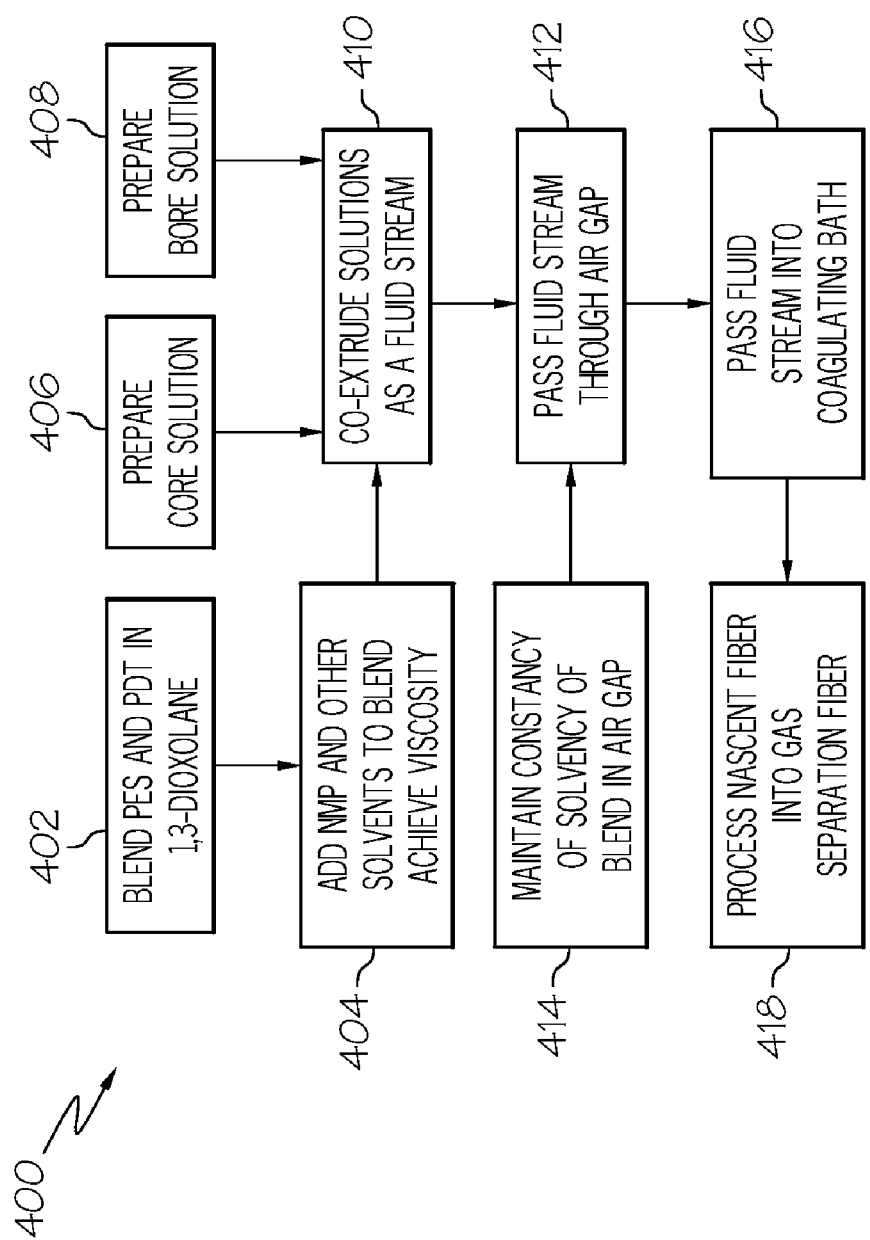
FIG. 4 is a flow chart of a method of producing a gas separation fiber in accordance with the present invention.

Referring now to FIG. 4, a flow chart 400 may illustrate an embodiment of the present invention that may be considered to be a method for producing gas separation hollow fiber membranes. In a step 402, a blend of PES and PDT may be produced (e.g., about 7 parts PES and one part PDT may be dissolved and mixed in a solvent such as 1, 3 dioxolane). In a step 404, other solvents may be added to the blend to produce a sheath solution with a desired viscosity (e.g., the sheath solution 46 may be produced by adding NMP, isopropanol, acetone and octane to the blend of step 402 in proportions described in Table 3). In a step 406, a core solution may be prepared (e.g., the core solution 44 may be prepared from 35% PES and 65% NMP). In a step 408, a bore solution may be prepared (e.g., the bore solution 46 may be prepared from 90% NMP and 10% water).

In a step 410, the solutions produced in the steps 404, 406 and 408 may be co-extruded as a fluid stream (e.g., the solutions 42, 44 and 46 may be passed through the co-extrusion spinneret 48 to form the fluid stream 50). In steps 412 and 414, which may be performed simultaneously, the fluid stream may be passed through an air gap while a constancy of solvency of the blend PES and PDT may be maintained (e.g., the fluid stream 50 may pass through the air gap 52 while a ratio of NMP to 1,3-dioxolane may vary). In a step 416 the fluid stream may pass into a coagulating bath to produce a nascent fiber (e.g. the fluid stream 50 may enter the water bath 56 wherein water miscible solvents may be diluted and wherein polymers may precipitate from the fluid stream to form a fiber). In a step 418, the nascent fiber may be further processed with well-known cleaning and drying steps produce a gas separation fiber (e.g., the gas separation fiber 22).

It should be understood, of course, that the foregoing relates to exemplary embodiments of the invention and that modifications may be made without departing from the spirit and scope of the invention as set forth in the following claims.

We claim:

1. A gas separation membrane comprising a blend of polyethersulfone (PES) and aromatic polyimide polymers that comprise a plurality of first repeating units of formula (I)

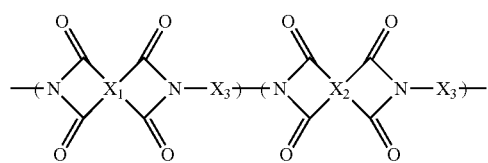
(I)

wherein
X₁ is selected from the group consisting of

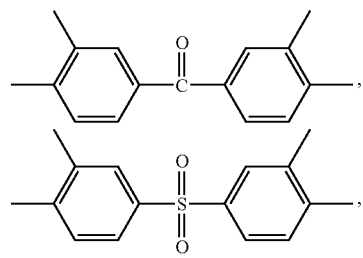

and mixtures thereof;
X₂ is selected from the group consisting of

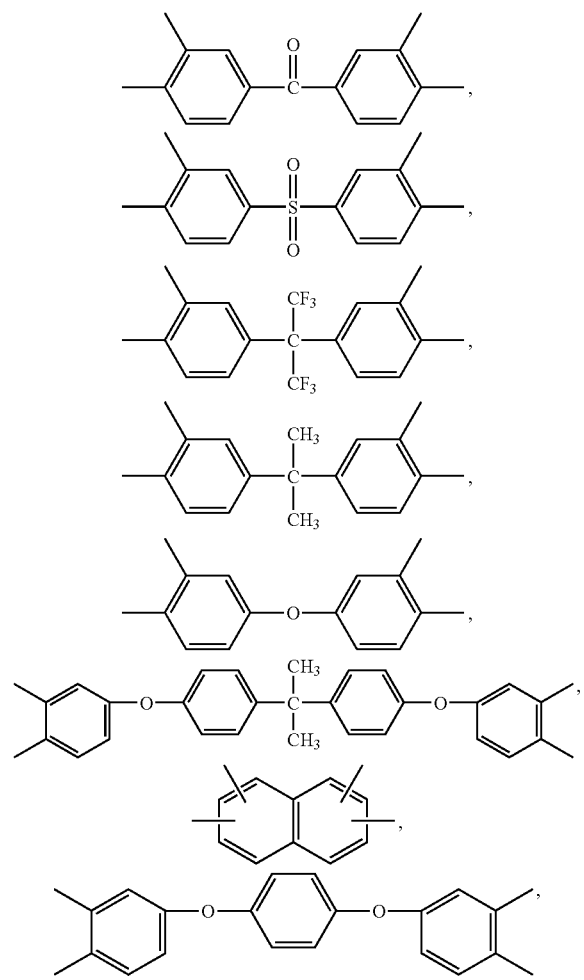

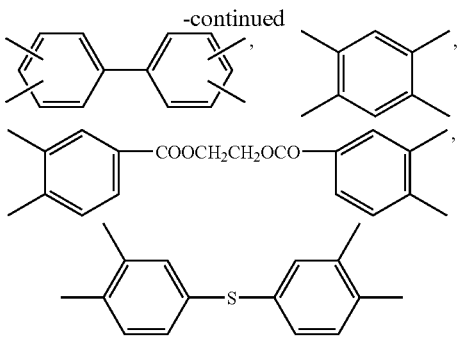

and mixtures thereof; and
X₃ is selected from the group consisting of

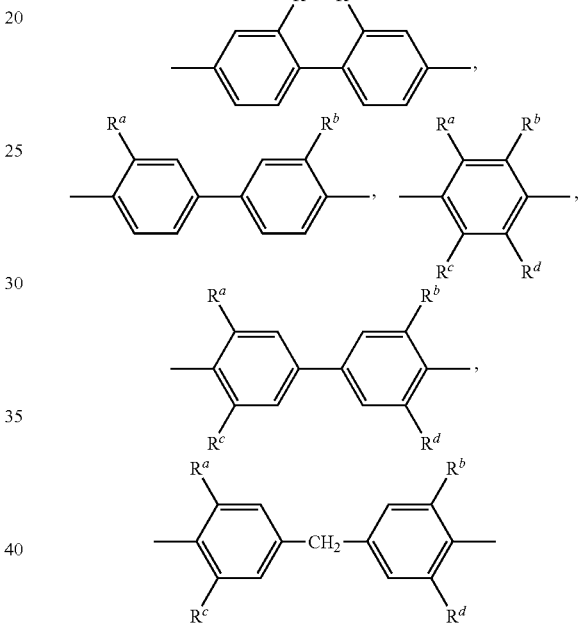

and mixtures thereof,
wherein the phenyl groups of $X_1$, $X_2$ and $X_3$ are optionally substituted with one or more substituents independently selected from the group consisting of $C_1$-$C_3$ alkyl, $C_1$-$C_3$ alkoxy, halogen, nitro and —$NR^1R^2$,
wherein $R^a$, $R^b$, $R^c$ and $R^d$ are each independently $C_1$-$C_3$ alkyl,
$R^1$ and $R^2$ are H or $C_1$-$C_3$ alkyl, provided that both $R^1$ and $R^2$ are not H, and
the gas separation membrane has a layer of said blend of PES and aromatic polyimide polymers with a thickness from about 0.1 micron to about 3.0 microns.

2. The gas separation membrane of claim 1, wherein each of $R^a$, $R^b$, $R^c$ and $R^d$ are $CH_3$ and the phenyl groups of $X_1$, $X_2$ and $X_3$ are unsubstituted.

3. The gas separation membrane of claim 2 wherein at least one of the polyimides comprises sulfone groups.

4. The gas separation membrane of claim 3 wherein the at least one polyimide comprises poly(3,3',4,4'-diphenylsulfonetetracarboxylic dianhydride-3,3',5,5'-tetramethyl-4,4'-methylene dianiline) (PDT).

5. The gas separation membrane of claim 4 wherein the membrane has a shape of a cylinder formed concentrically formed around a hollow core.

6. The gas separation membrane of claim 5 wherein a ratio of PES to PDT is about 7 to 1.

7. A gas separation unit comprising:

a thin-film gas separation membrane;

a support structure for the membrane, the support structure comprising a polyethersulfone polymer; and wherein the gas separation membrane comprises a blend of polyethersulfone and aromatic polyimide polymers that comprise a plurality of first repeating units of formula (I)

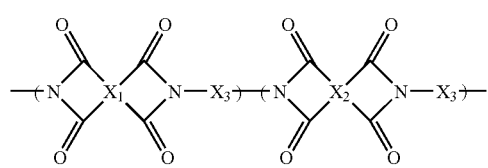

(I)

wherein $X_1$ is selected from the group consisting of

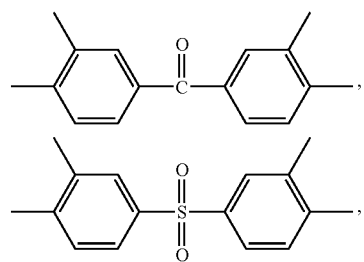

and mixtures thereof;

$X_2$ is selected from the group consisting of

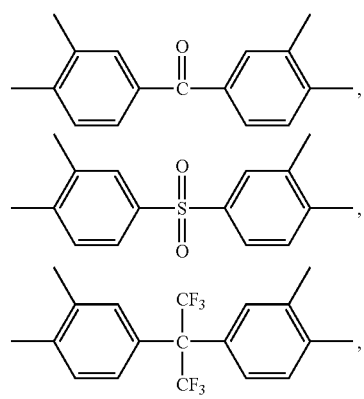

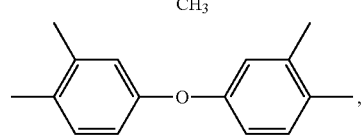

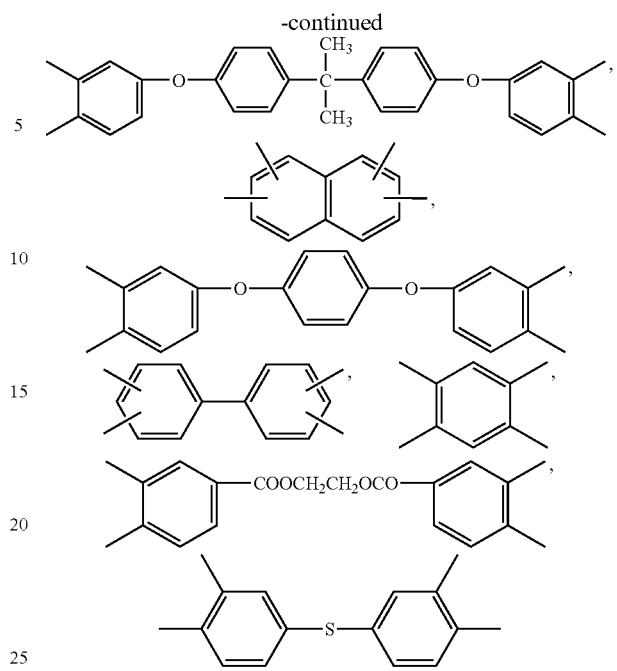

and mixtures thereof; and $X_3$ is selected from the group consisting of

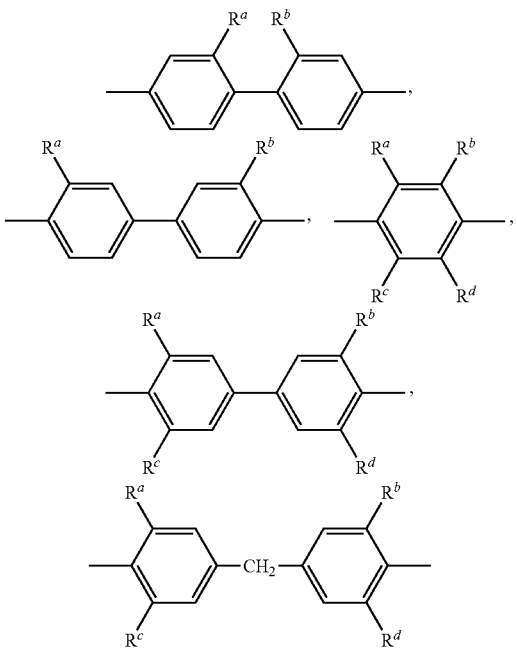

and mixtures thereof, wherein the phenyl groups of $X_1$, $X_2$ and $X_3$ are optionally substituted with one or more substituents independently selected from the group consisting of $C_1$-$C_3$ alkyl, $C_1$-$C_3$ alkoxy, halogen, nitro and —$NR^1R^2$, wherein $R^a$, $R^b$, $R^c$ and $R^d$ are each independently $C_1$-$C_3$ alkyl, and $R^1$ and $R^2$ are H or $C_1$-$C_3$ alkyl, provided that both $R^1$ and $R^2$ are not H.

8. The gas separation membrane of claim 7, wherein each of $R^a$, $R^b$, $R^c$ and $R^d$ are $CH_3$ and the phenyl groups of $X_1$, $X_2$ and $X_3$ are unsubstituted.

9. The gas separation unit of claim 8 wherein the support structure comprises PES.

10. The gas separation unit of claim 9 wherein the support structure is a hollow cylinder.

11. The gas separation unit of claim 10 wherein the gas separation membrane is a thin film formed concentrically on the hollow cylinder support structure.

12. The gas separation unit of claim 11 wherein the blend comprises at least one polyimide that includes a sulfone dianhydride.

13. The gas separation unit of claim 12 wherein the blend includes poly(DSDA-TMMDA) (PDT).

14. The gas separation unit of claim 13 wherein the gas separation membrane is dense enough to separate oxygen ($O_2$) from air.

15. The gas separation membrane of claim 14 wherein selectivity $\alpha_{O2/N2}$ is at least as high as 3 and permeability for $O_2$ is at least as high as 9 Barrer.

16. A gas separation membrane comprising an isolated blend of polyethersulfone (PES) and aromatic polyimide polymers that comprise a plurality of first repeating units of formula (I)

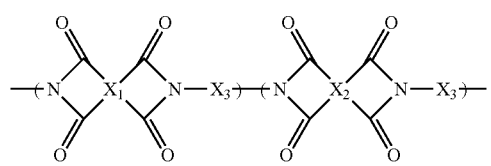

(I)

wherein $X_1$ is selected from the group consisting of

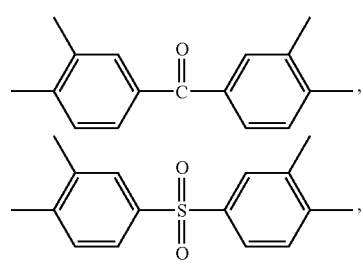

and mixtures thereof;

$X_2$ is selected from the group consisting of

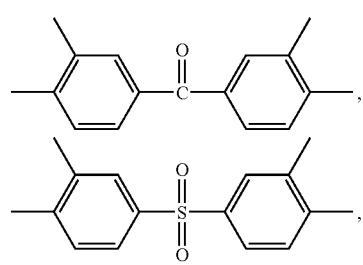

-continued

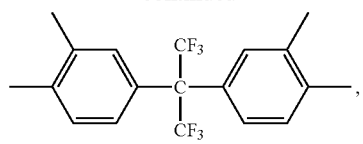

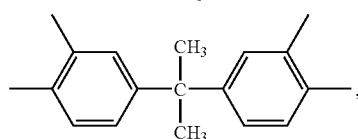

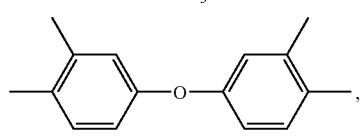

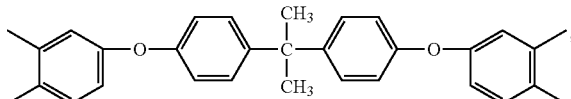

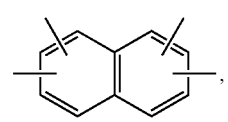

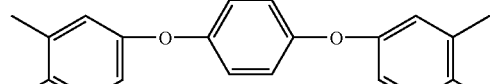

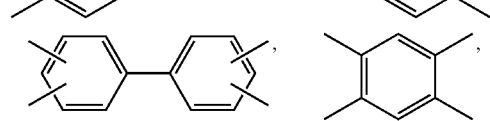

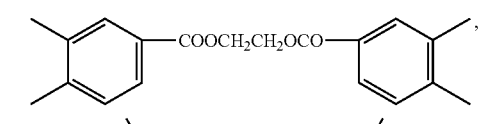

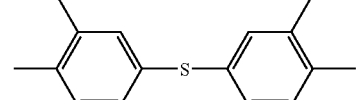

and mixtures thereof; and $X_3$ is selected from the group consisting of

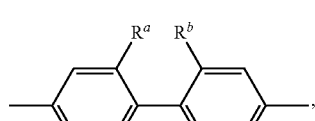

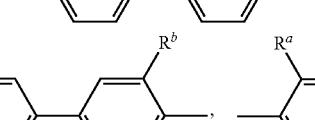

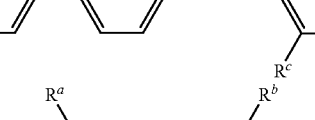

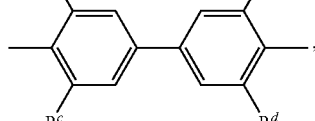

-continued

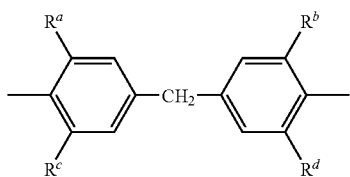

and mixtures thereof, wherein the phenyl groups of $X_1$, $X_2$ and $X_3$ are optionally substituted with one or more substituents independently selected from the group consisting of $C_1$-$C_3$ alkyl, $C_1$-$C_3$ alkoxy, halogen, nitro and —$NR^1R^2$, wherein $R^a$, $R^b$, $R^c$ and $R^d$ are each independently $C_1$-$C_3$ alkyl, $R^1$ and $R^2$ are H or $C_{1\text{-}3}$ alkyl, provided that both $R^1$ and $R^2$ are not H, and a ratio of PES to polyimide is about 7 to 1.

17. The gas separation membrane of claim 16 wherein at least one of the polyimides comprises sulfone groups.

18. The gas separation membrane of claim 16 wherein the at least one polyimide comprises poly(3,3',4,4'-diphenylsulfonetetracarboxylic dianhydride-3,3',5,5'-tetramethyl-4,4'-methylene dianiline) (PDT).

19. The gas separation membrane of claim 16 further comprising a support structure for the membrane, the support structure comprising a polyethersulfone polymer.

* * * * *